United States Patent
Tseng et al.

(10) Patent No.: US 8,541,539 B2
(45) Date of Patent: Sep. 24, 2013

(54) METHOD FOR PREPARING A WATER-SOLUBLE POLYAMIDE

(75) Inventors: Yu-Chi Tseng, Chungli (TW); Chin-Wen Chen, Taipei County (TW); S-P Rwei, Taipei (TW)

(73) Assignee: Taiwan Textile Research Institute, Taipei Hsien (TW)

( * ) Notice: Subject to any disclaimer, the term of this patent is extended or adjusted under 35 U.S.C. 154(b) by 855 days.

(21) Appl. No.: 12/345,171

(22) Filed: Dec. 29, 2008

(65) Prior Publication Data
US 2010/0152328 A1 Jun. 17, 2010

(30) Foreign Application Priority Data
Dec. 16, 2008 (TW) .............................. 97148999 A

(51) Int. Cl.
*C08G 69/08* (2006.01)
(52) U.S. Cl.
USPC ........ 528/321; 528/324; 528/329.1; 528/337; 528/360; 528/363; 528/364; 528/391
(58) Field of Classification Search
USPC .............. 524/602; 528/321, 324, 329.1, 337, 528/360, 363, 364, 391
See application file for complete search history.

(56) References Cited

U.S. PATENT DOCUMENTS

| | | | | |
|---|---|---|---|---|
| 5,086,162 A | * | 2/1992 | Speranza et al. | 528/339 |
| 6,232,371 B1 | * | 5/2001 | Caswell et al. | 523/205 |
| 6,680,364 B1 | * | 1/2004 | Linemann | 528/310 |

FOREIGN PATENT DOCUMENTS

| | | |
|---|---|---|
| EP | 1642925 A1 | 4/2006 |
| TW | I251603 B | 3/2006 |

* cited by examiner

*Primary Examiner* — Ling Choi
*Assistant Examiner* — Wenwen Cai
(74) *Attorney, Agent, or Firm* — Rabin & Berdo, P.C.

(57) ABSTRACT

A method for preparing a water-soluble polyamide, includes copolymerizing reactive monomers including caprolactam; ethylene glycol bis(2-aminoethyl)ether or ethylene glycol bis(3-aminopropyl)ether; and 5-sulfoisophthalic acid monosodium salt, wherein a molar ratio of caprolactam:ethylene glycol bis(2-aminoethyl)ether or ethylene glycol bis(3-aminopropyl)ether:5-sulfoisophthalic acid monosodium salt is about 0:1:1 to about 5:1:1, advantageously about 1.85:1:1. Copolymerizing takes place at a copolymerization temperature of about 222-250° C. and a copolymerization pressure of about 3 Bar. The method further includes maintaining a temperature of about 222-250° C. for about 2-3 hours under normal pressure after the copolymerization step. The water-soluble polyamide has a solubility in water of about 10-70%.

10 Claims, 4 Drawing Sheets

METHOD FOR PREPARING A WATER-SOLUBLE POLYAMIDE

RELATED APPLICATIONS

This application claims priority to Taiwan Application Serial No. 97148999, filed Dec. 16, 2008, which is herein incorporated by reference.

BACKGROUND

1. Field of Invention

The present invention relates to a polyamide masterbatch composition. More particularly, the present invention relates to a carbon black-containing polyamide masterbatch composition.

2. Description of Related Art

Preparing polymeric masterbatch so as to endow the polymers with different chemical or physical properties has been the goal of polymer material industry. However, during the preparation of the modified polymeric masterbatch, the modifying agent to be added may be difficult to be well mixed with the polymer. Even if the modifying agent can be mixed with the polymer, the physical properties of the modified polymer may differ significantly from the original polymer so that the industrial application such as the spinnability of the polymer may be jeopardized.

For example, when using organic dyes to prepare modified polyamide masterbatch, many organic dyes would cross-link with the polyamide and thus increase the viscosity of the polyamide and reduce the spinnability of the polyamide. In some other cases, the dyes themselves may aggregate, which would downgrade the quality of the fiber formed therefrom. Similarly, other kinds of modifying agents may be confronted with resembling disadvantages.

In view of the foregoing, there is an urgent need to provide a method for preparing modified polyamide masterbatch.

SUMMARY

In one aspect, the present invention is directed to a water-soluble polyamide and method for preparing the same. The solubility of the water-soluble polyamide in water is about 10-70%. The water-soluble polyamide is suitable to be used as a dispersing agent of other modifying agents.

According to one embodiment of the present invention, a method for preparing the water-soluble polyamide comprises copolymerizing reactive monomers of caprolactam, ethylene glycol bis(2-aminoethyl)ether ($H_2N(C_2H_4O)_2C_2H_4NH_2$) or ethylene glycol bis(3-aminopropyl)ether ($H_2N(C_3H_6O)_2C_3H_6NH_2$), and 5-sulfoisophthalic acid monosodium salt, wherein the molar ratio of the reactive monomers is about 0:1:1 to about 5:1:1.

In another aspect, the present invention is directed to a carbon black-containing polyamide masterbatch and a method for preparing the same. In this aspect, the water-soluble polyamide mentioned above is used as a dispersing agent to prepare the carbon black-containing polyamide masterbatch. The carbon black-containing polyamide masterbatch is a functional masterbatch that can be used as a cation dyeable polyamide masterbatch, an antistatic polyamide masterbatch or a conductive polyamide masterbatch.

According to another embodiment of the present invention, the method for preparing the carbon black-containing polyamide masterbatch includes the steps of forming a carbon black dispersion, drying the carbon black dispersion to obtain an admixture thereof and compounding a polyamide with the admixture to obtain the carbon black-containing polyamide masterbatch. The carbon black dispersion can be formed by adding a water-soluble polyamide and carbon black into a solvent and then uniformly dispersing the carbon black in the solvent. The water-soluble polyamide can be prepared according to the above-mentioned aspect of the present invention.

In yet another aspect, the present invention is directed to a functional nylon fabric. The functional nylon fabric comprises nylon filaments made from a carbon black-containing polyamide masterbatch.

According to other embodiments of the present invention, the carbon black-containing polyamide masterbatch can be prepared according to the above-mentioned aspects of the present invention.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
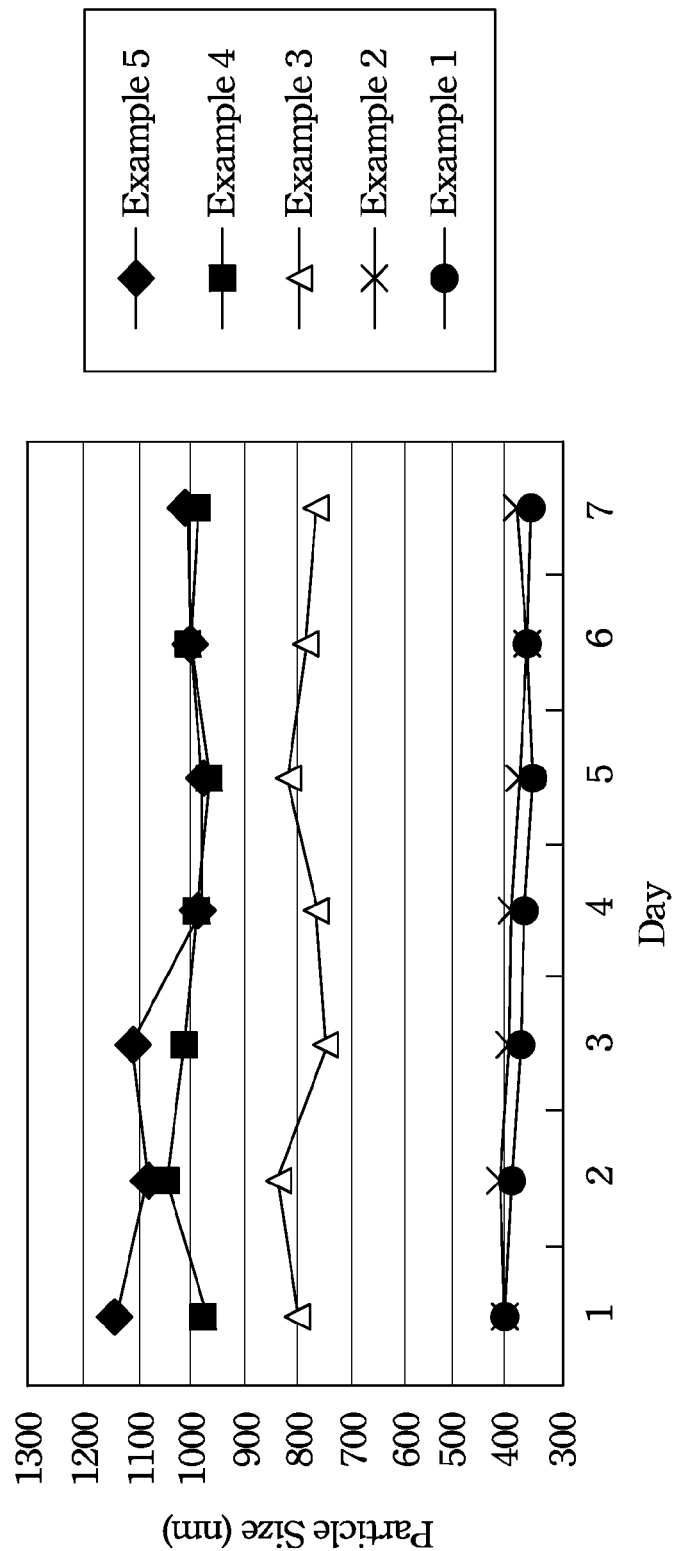
FIG. 1 is a graph showing the size distribution of the admixture of the carbon black and the water-soluble polyamide of one example of the present invention.

Reference will now be made in detail to the present embodiments of the invention. The surface resistances of the carbon black-containing polyamide masterbatches prepared according to the embodiments of the present invention were further investigated to evaluate the property of the carbon black-containing polyamide masterbatches.

(I) Water-soluble Polyamide and Method for Preparing the Same

In one aspect, the present invention is directed to a water-soluble polyamide and method for preparing the same.

According to embodiments of the present invention, the method for preparing the water-soluble polyamide comprises copolymerizing reactive monomers of caprolactam, ethylene glycol bis(2-aminoethyl)ether or ethylene glycol bis(3-aminopropyl)ether, and 5-sulfoisophthalic acid monosodium salt, wherein the molar ratio of the reactive monomers is about 0:1:1 to about 5:1:1.

Specifically, according to one embodiment of the present invention, the method for preparing the water-soluble polyamide comprises copolymerizing reactive monomers of caprolactam, ethylene glycol bis(2-aminoethyl), and 5-sulfoisophthalic acid monosodium salt, wherein the molar ratio of the reactive monomers is about 1.85:1:1

According to embodiments of the present invention, the copolymerization step is conducted at a copolymerization temperature of about 222-250° C. and under a copolymerization pressure of about 3 Bar. After the copolymerization step, the reaction system can be maintained at a temperature of about 222-250° C. for about 2-3 hours under normal pressure.

The present invention is further illustrated by the following examples. First, polyamide was prepared according to the method described above. Then, the resultant polyamide was added to 100 parts water to observe solubility. A summary of several samples is given in Table 1 below.

TABLE 1

| | Molar ratio of Reactive Monomers | | | |
| --- | --- | --- | --- | --- |
| | caprolactam | ethylene glycol bis(2-amino-ethyl)ether | 5-sulfoisophthalic acid monosodium salt | Solubility (%) |
| Example A | 0 | 1 | 1 | 70 |
| Example B | 1.85 | 1 | 1 | 50 |
| Example C | 2 | 1 | 1 | 45 |
| Example D | 4 | 1 | 1 | 30 |
| Example E | 4.56 | 1 | 1 | 10 |
| Control | 9 | 1 | 1 | <10 |

As can be seen in Table 1, the polyamide according to the embodiments of the present invention has a solubility of about 10-70% while the polyamide of control group has a solubility less than 10%. The resultant polyamide of the embodiments of the present invention has great solubility, and is useful as a dispersing agent for other modifying agents.

As will occur to those skilled in the art, the molar ratio of caprolactam/ethylene glycol bis(2-aminoethyl)ether/5-sulfoisophthalic acid monosodium salt can be adjusted to control the molecular weight of the resultant water-soluble polyamide. For example, water-soluble polyamide with higher molecular weight can be obtained by using more caprolactam. However, as can be seen in Table 1, higher molar content of caprolactam would lead to lower solubility of the resultant polyamide. Therefore, it is possible to adjust the molar ratio of the reactive monomers so as to obtain water-soluble polyamide with desirable molecular weight and/or solubility.

For the purpose of illustration but not limitation, the water-soluble polyamide of Example B has a molecular weight of about 8000 Da and solubility of about 50%. In applications where dispersing agent with higher solubility is required, the water-soluble polyamide of Example B would be a desirable water-soluble polyamide.

However, in some other applications, dispersing agent with lower solubility might be preferred. In the following experiments, carbon black is the modifying agent to be dispersed and the carbon black solution is known to have high viscosity. Thus, one consideration of the embodiments of the present invention is to decrease the solid content of the dispersion so as to lower the viscosity thereof. Therefore, the water-soluble polyamide of Example D which has a solubility of about 30% was a suitable dispersing agent for dispersing carbon black in the following examples.

(II) Carbon Black-containing Polyamide Masterbatch and Method for Preparing the Same In another aspect, the present invention is directed to a carbon black-containing polyamide masterbatch and method for preparing the same. In this aspect, the water-soluble polyamide of the previous aspect of the present invention was used as a dispersing agent for carbon black so as to prepare the carbon black-containing polyamide masterbatch.

According to one embodiment of the present invention, the method for preparing a carbon black-containing polyamide masterbatch comprises the steps of:

(a) preparing a carbon black dispersion, which is accomplished by adding the water-soluble polyamide of the embodiments of the present invention and carbon black into a solvent, and disperse carbon black in the solvent, wherein the weight ratio of the water-soluble polyamide to carbon black is about 1:1 to about 1:5;

(b) obtaining an admixture comprising the dispersed carbon black and the water-soluble polyamide, which is accomplished by drying the carbon black dispersion of the step (a); and (c) obtaining carbon black-containing polyamide masterbatch, which is accomplished by compounding a polyamide with the admixture of the step (b).

According to embodiments of the present invention, in the step (c), the weight ratio of the admixture to the polyamide is about 0.06:1 to about 4:1. In other words, the amount of the carbon black in the carbon black-containing polyamide masterbatch is about 4-40% by weight.

According to embodiments of the present invention, the polyamide of the step (c) can be nylon 6, nylon 11, nylon 12, nylon 46 or nylon 66.

According to embodiments of the present invention, the solvent can be water or methanol.

According to embodiments of the present invention, the admixture of the step (b) can be ground before the step (c) is carried out. Said grinding can be accomplished by a grinding machine or other apparatus. In the following examples, PML-H/V grinding machine of Drais Mannheim was used.

The step (c) can be carried out in a twin screw compounding apparatus, wherein the molten carbon black-containing polyamide can be molded, cooled, and cut to obtain carbon black-containing polyamide masterbatch having a diameter of about 2.5-2.8 mm. However, it is apparent to those skilled in the art that other suitable apparatuses and methods can be used to obtain the carbon black-containing polyamide masterbatch.

(1) Particle Size Analysis of Admixture of Water-soluble Polyamide and Carbon Black In the following examples, the water-soluble polyamides of the above examples were used to disperse carbon black so as to obtain an admixture of water-soluble polyamide and carbon black. The admixture samples were prepared by the following procedure. First, carbon black dispersions were prepared according to the embodiments of the present invention, wherein the water-soluble polyamide of Example D was used as dispersing agent in Examples 1-5, while the water-soluble polyamide of Example B was used as dispersing agent in Examples 6-7. The carbon black dispersions were allowed to stand at room temperature and the dispersions were dried to obtain admixture samples on day 1, 2, 3, 4, 5, 6, and 7. Particle size of each sample was measured by particle size analyzer. The weight ratio of water-soluble polyamide to carbon black in each example was listed in table 2, and the mean particle size of samples prepared on day 1 to day 7 were showed in FIGS. 1 and 2.

TABLE 2

| | Weight ratio of water-soluble polyamide to carbon black |
| --- | --- |
| Example 1 | 1:1 |
| Example 2 | 1:2 |
| Example 3 | 1:3 |
| Example 4 | 1:4 |

TABLE 2-continued

|  | Weight ratio of water-soluble polyamide to carbon black |
|---|---|
| Example 5 | 1:5 |
| Example 6 | 1:1 |
| Example 7 | 1:2 |

It can be seen in FIG. 1, the admixtures of Examples 1 and 2 have a particle size of about 400 nm, the admixture of Example 3 has a particle size of about 800 nm, and the admixtures of Examples 4 and 5 have a particle size greater than about 1000 nm. It is concluded that when the weight ratio of water-soluble polyamide to carbon black is about 1:1 to about 1:2 (Examples 1 and 2), the mean particle size of the admixture is significantly smaller than that of the other examples; and thus the carbon black was better dispersed in this case.

Still refer to FIG. 1, with respect to Examples 1 to 5, the admixture of each example obtained on day 7 has a particle size similar to that of the admixture obtained on day 1. For example, the admixtures of Example 2 prepared on day 1 and day 2 both have a particle size of about 400 nm. This result suggests that the dispersion states of the carbon black dispersions prepared according to the embodiments do not change significantly over 1 week. Therefore, the water-soluble polyamide according to the embodiments of the present invention is useful as dispersing agent for other modifying agents and the dispersion stability of the dispersion is desirable.

Figure 2:
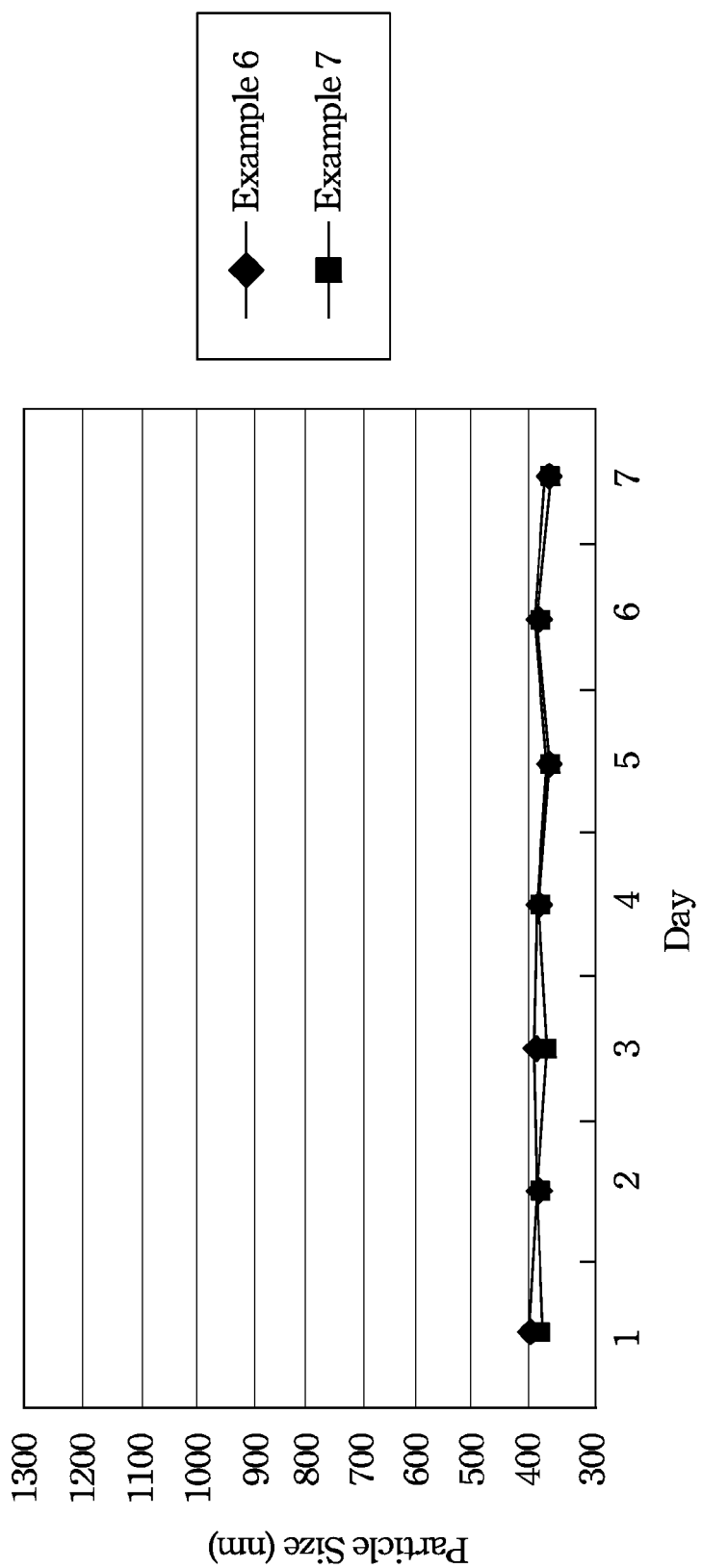
FIG. 2 is a graph showing the size distribution of the admixture of the carbon black and the water-soluble polyamide of another example of the present invention.

Similarly, it can be seen in FIG. 2 that when the weight ratio of water-soluble polyamide to carbon black is about 1:1 to about 1:2 (Examples 6 and 7), the mean particle size of the admixture is about 350-400 nm. With respect to Examples 6 and 7, the admixture of each example obtained on day 7 has a particle size similar to that of the admixture obtained on day 1.

(2) Surface Resistance of Carbon Black-containing Polyamide Masterbatch

In the following examples, polyamide (nylon 6) was compounded with the admixture of Examples 1 to 6 to prepare carbon black-containing polyamide masterbatches. Then, the surface resistance of the resultant carbon black-containing polyamide masterbatch was measured by Loresta GP Multi-function Resistivity Meter (Model No. MCP-T600).

In this specification, the term "antistatic" is referred to substance with a surface resistance of about $10^4$-$10^{11}$ ohm/sq, while the term "conductive" is referred to substance with a surface resistance smaller than $10^4$ ohm/sq.

In the first series of experiments, the different amount of nylon 6 were compound with the admixture of Example 6 to obtain polyamide masterbatches containing about 1-8% carbon black by weight. The measurements of surface resistance were shown in FIG. 3.

Figure 3:
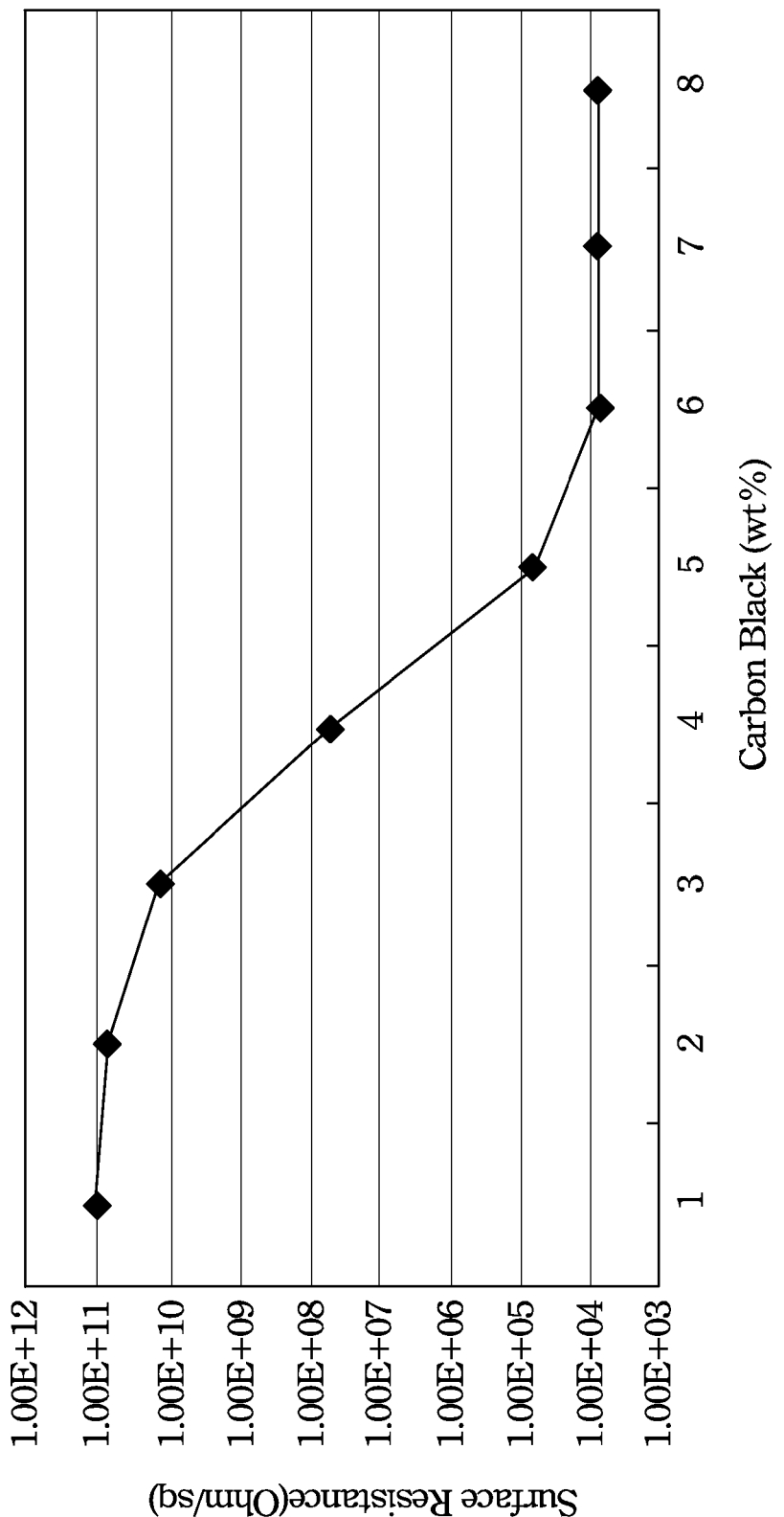
FIG. 3 is a graph illustrating the surface resistance measurements of the carbon black-containing polyamide masterbatch of one example of the present invention.

Refer to FIG. 3, the polyamide masterbatch with no carbon black has a surface resistance greater than $10^{13}$ ohm/sq, which means the polyamide masterbatch is neither antistatic nor conductive. Moreover, the polyamide masterbatches containing about 1-6 wt % carbon black have a surface resistance of about $10^4$-$10^{11}$ ohm/sq, and thus the polyamide masterbatches containing about 1-6 wt % carbon black can be categorized as antistatic masterbatch. Furthermore, the polyamide masterbatches containing carbon black content more than 6% have surface resistance smaller than about $10^4$ ohm/sq, and these masterbatches are conductive masterbatches. As will occur to those skilled in the art, the weight percentage of carbon black can be adjusted to obtain carbon black-containing polyamide masterbatch with antistatic or conductive ability.

Besides, since 5-sulfoisophthalic acid monosodium salt is used to prepare the carbon black-containing polyamide masterbatch according to the embodiments of the present invention, the resultant carbon black-containing polyamide masterbatch may also be provided with cationic dyeable groups.

However, although the surface resistance of the carbon black-containing polyamide masterbatch can be improved by increasing the weight percentage of the carbon black thereof, excess amount of carbon black may jeopardize the property and spinnability of the polyamide masterbatch itself. Maximal weight percentage of carbon black in the carbon black-containing polyamide masterbatch is about 40 wt %. According to another example (not shown in FIG. 3) of the present invention, the surface resistance of carbon black-containing polyamide masterbatch containing about 40 wt % carbon black is about $10^2$ ohm/sq.

In the second series of experiments, different amounts of nylon 6 were compounded with the admixtures of Example 1 to 5 to obtain polyamide masterbatches with about 6 wt % carbon black (Examples M1 to M5). The weight ratio of water-soluble polyamide to carbon black and the weight percentage of carbon black of the polyamide masterbatch of each example were listed in table 3. The measurements of surface resistance of Examples M1 to M5 were shown in FIG. 4.

TABLE 3

|  | water-soluble polyamide:carbon black | carbon black (wt %) |
|---|---|---|
| Example M1 | 1:1 | 6 |
| Example M2 | 1:2 | 6 |
| Example M3 | 1:3 | 6 |
| Example M4 | 1:4 | 6 |
| Example M5 | 1:5 | 6 |

Figure 4:
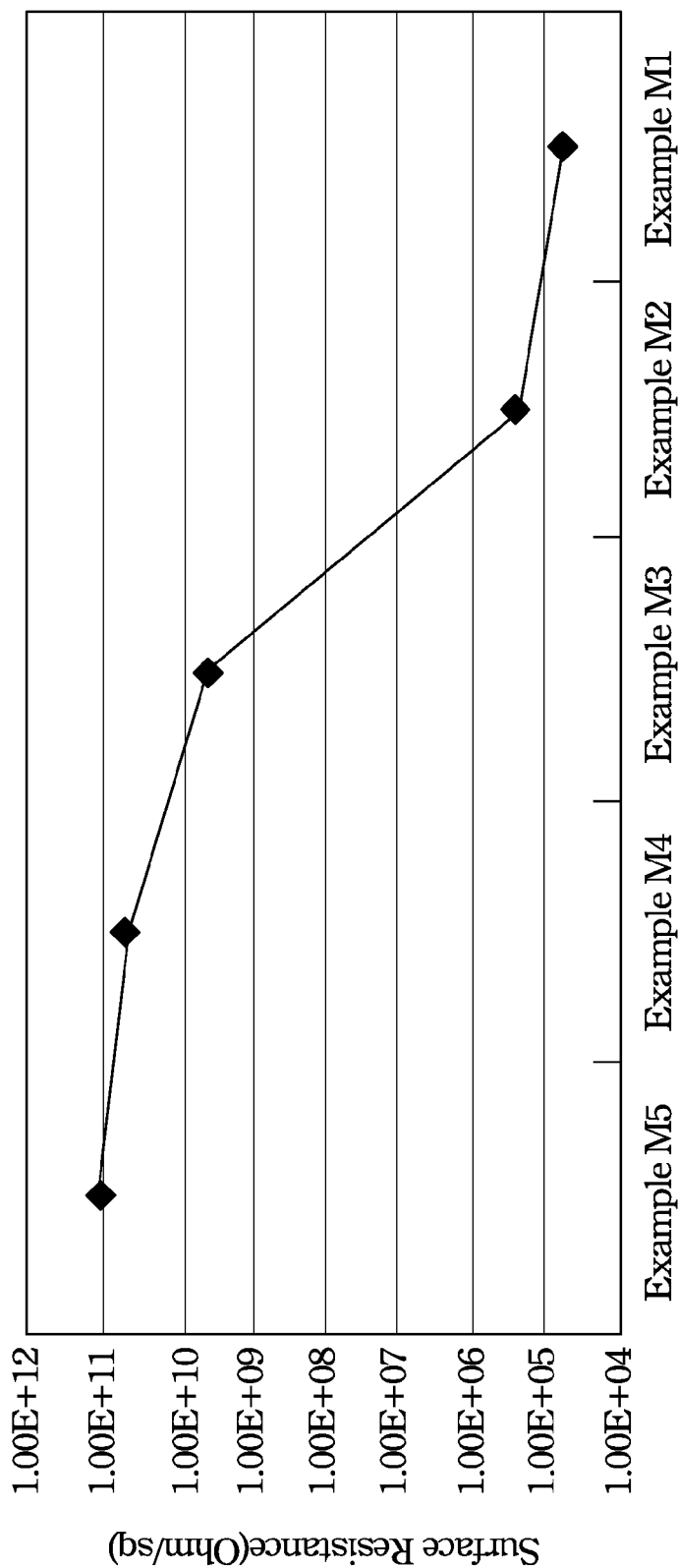
FIG. 4 is a graph illustrating the surface resistance measurements of the carbon black-containing polyamide masterbatch of another example of the present invention.

As can be seen in FIG. 4 and table 3, the surface resistance of masterbatch would change as the weight ratio of water-soluble polyamide to carbon black differs. For example, the admixture of Example M5 has a dispersing agent (water-soluble polyamide)/carbon black weight ratio of about 1:5, and the carbon black-containing polyamide masterbatch thus obtained has a surface resistance of about $10^{11}$ ohm/sq; while the admixture of Example M1 has a dispersing agent/carbon black weight ratio of about 1:1, and the carbon black-containing polyamide masterbatch thus obtained has a surface resistance of about $7 \times 10^4$ ohm/sq. From the data shown in FIG. 4, in can be inferred that the higher concentration of carbon black in the carbon black dispersion might result in greater surface resistance of the carbon black-containing polyamide masterbatch, and vice versa.

(III) Functional Nylon Fabric

In yet another aspect, the present invention is directed to a functional nylon fabric. The functional nylon fabric comprises nylon filaments made from a carbon black-containing polyamide masterbatch.

According to other embodiments of the present invention, the carbon black-containing polyamide masterbatch can be prepared according to the above-mentioned aspects of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for preparing a water-soluble polyamide, comprising the steps of:
    copolymerizing reactive monomers including:
        caprolactam;
        ethylene glycol bis(2-aminoethyl)ether or ethylene glycol bis(3-aminopropyl)ether; and
        5-sulfoisophthalic acid monosodium salt,
        wherein the reactive monomers have a molar ratio of caprolactam:ethylene glycol bis(2-aminoethyl)ether or ethylene glycol bis(3-aminopropyl)ether:5-sulfoisophthalic acid monosodium salt is about 0:1:1 to about 5:1:1, and
        wherein the reactive monomers have a molar ratio of sulphonate group to carboxyl group is 0.5.

2. The method for preparing a water-soluble polyamide of claim 1, wherein copolymerizing takes place at a copolymerization temperature of about 222-250° C. and a copolymerization pressure of about 3 Bar.

3. The method for preparing a water-soluble polyamide of claim 2, further comprising maintaining a temperature of about 222-250° C. for about 2-3 hours under normal pressure after the copolymerization step.

4. The method for preparing a water-soluble polyamide of claim 1, wherein the molar ratio of caprolactam:ethylene glycol bis(2-aminoethyl)ether or ethylene glycol bis(3-aminopropyl)ether:5-sulfoisophthalic acid monosodium salt is about 1.85:1:1.

5. The method for preparing a water-soluble polyamide of claim 1, wherein the water-soluble polyamide has a solubility in water of about 10-70%.

6. A method for preparing a carbon black-containing polyamide masterbatch composition, comprising: (a) preparing a water-soluble polyamide by copolymerizing reactive monomers including: caprolactam; ethylene glycol bis(2-aminoethyl)ether or ethylene glycol bis(3-aminopropyl)ether; and 5-sulfoisophthalic acid monosodium salt, wherein the reactive monomers have a molar ratio of caprolactam:ethylene glycol bis(2-aminoethyl)ether or ethylene glycol bis(3-aminopropyl)ether: 5-sulfoisophthalic acid monosodium salt is about 0:1:1 to about 5:1:1, and wherein the reactive monomers have a molar ratio of sulphonate group to carboxyl group is 0.5; (b) adding the water-soluble polyamide and carbon black into a solvent and dispersing the carbon black in the solvent to obtain a carbon black dispersion; (c) drying the carbon black dispersion to obtain an admixture, wherein the admixture comprises the dispersed carbon black and the water-soluble polyamide; (d) compounding a polyamide with the admixture to obtain the carbon black-containing polyamide masterbatch composition.

7. The method for preparing a carbon black-containing polyamide masterbatch composition of claim 6, wherein a weight ratio of the water-soluble polyamide to the carbon black is about 1:1 to about 1:5.

8. The method for preparing a carbon black-containing polyamide masterbatch composition of claim 6, wherein a weight ratio of the admixture to the polyamide is about 0.06:1 to about 4:1.

9. The method for preparing a carbon black-containing polyamide masterbatch composition of claim 6, wherein the polyamide is nylon 6, nylon 11, nylon 12, nylon 46 or nylon 66.

10. The method for preparing a carbon black-containing polyamide masterbatch composition of claim 6, wherein the solvent is water.

* * * * *